(12) United States Patent
Arakawa et al.

(10) Patent No.: US 10,237,561 B2
(45) Date of Patent: Mar. 19, 2019

(54) VIDEO CODING APPARATUS AND VIDEO CODING METHOD

(71) Applicant: Panasonic Intellectual Property Management Co., Ltd., Osaka (JP)

(72) Inventors: Hiroshi Arakawa, Tokyo (JP); Kiyofumi Abe, Osaka (JP); Kazuhito Kimura, Shiga (JP); Hideyuki Ohgose, Osaka (JP); Koji Arimura, Tokyo (JP); Kazuma Sakakibara, Shizuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/690,645

(22) Filed: Aug. 30, 2017

(65) Prior Publication Data

US 2017/0366815 A1    Dec. 21, 2017

Related U.S. Application Data

(63) Continuation of application No. 14/611,871, filed on Feb. 2, 2015, now Pat. No. 9,781,434.

(30) Foreign Application Priority Data

Feb. 4, 2014  (JP) .................................. 2014-019044
Oct. 30, 2014  (JP) ................................. 2014-221646

(51) Int. Cl.
*H04N 19/159*    (2014.01)
*H04N 19/176*    (2014.01)
(Continued)

(52) U.S. Cl.
CPC ......... *H04N 19/159* (2014.11); *H04N 19/107* (2014.11); *H04N 19/119* (2014.11); *H04N 19/176* (2014.11)

(58) Field of Classification Search
CPC .. H04N 19/176; H04N 19/124; H04N 19/119; H04N 19/172; H04N 19/137; H04N 19/107
See application file for complete search history.

(56) References Cited

U.S. PATENT DOCUMENTS 6,084,908 A    7/2000  Chiang et al.
8,855,203 B2  10/2014  Yamamoto et al.
(Continued)

FOREIGN PATENT DOCUMENTS

JP    2004-112825    4/2004
JP    2012-138773    7/2012
(Continued)

OTHER PUBLICATIONS

Benjamin Bross et al., "High Efficiency Video Coding (HEVC) text specification draft 10 (for FDIS & Last Call)", Joint Collaborative Team on Video Coding (JCT-VC) of ITU-T SG16 WP3 and ISO/IEC JTC1/SC29/WG11, JCTVCL1003_v34, 12th Meeting: Geneva, CH, Jan. 14-23, 2013, pp. 1-298.
(Continued)

*Primary Examiner* — Obafemi O Sosanya
(74) *Attorney, Agent, or Firm* — Wenderoth, Lind & Ponack, L.L.P.

(57) ABSTRACT

A video coding apparatus is a video coding apparatus which codes a coding target video based on a coding standard, and includes: a dividing unit which divides an image included in the coding target video into a plurality of control blocks; and a prediction image generating unit which divides each of the control blocks into a plurality of prediction blocks, and generates, for each of the prediction blocks, a prediction image using one of inter prediction and intra prediction, wherein the coding standard allows each of the control blocks to be divided into the prediction blocks such that the prediction blocks have different sizes, and the prediction
(Continued)

image generating unit divides each of the control blocks into the prediction blocks such that the prediction blocks all have an identical size, rather than dividing each of the control blocks into the prediction blocks such that the prediction blocks have different sizes.

4 Claims, 8 Drawing Sheets

(51) Int. Cl.
    *H04N 19/119*     (2014.01)
    *H04N 19/107*     (2014.01)

(56) References Cited

U.S. PATENT DOCUMENTS

| | | |
|---|---|---|
| 9,288,490 B2 | 3/2016 | Sasai |
| 2011/0170790 A1* | 7/2011 | Cheon ................... H04N 19/13 382/233 |
| 2012/0033731 A1 | 2/2012 | Yamamoto et al. |
| 2013/0163664 A1* | 6/2013 | Guo ..................... H04N 19/176 375/240.12 |

FOREIGN PATENT DOCUMENTS

| | | |
|---|---|---|
| JP | 2014-13975 | 1/2014 |
| WO | 2010-116869 | 10/2010 |

OTHER PUBLICATIONS

Ali Tabatabai, Toby Walker, "USNB Comments on the MPEG-4 Part 10 AVC FCD", Joint Video Team (JVT) of ISO/IEC MPEG & ITU-T VCEG (ISO/IEC JTC1/SC29/WG11 and ITU-T SG16 Q.6), 6th Meeting: Awaji, Island, JP, Dec. 5-13, 2002, Dec. 5, 2002, JVT-F089, pp. 1-5, URL,http://wftp3.itu.int/av-arch/jvt-site/2002_12_Awaji/JVT-F089-L.doc.

* cited by examiner

| CU size | PU size | TU size |
|---|---|---|
| 64×64 | 64×64, 64×32, 32×64, 32×32, 64×16, 64×48, 16×64, 48×64 | 32×32, 16×16, 8×8, 4×4 |
| 32×32 | 32×32, 32×16, 16×32, 16×16, 32×8, 32×24, 8×32, 24×32 | 32×32, 16×16, 8×8, 4×4 |
| 16×16 | 16×16, 16×8, 8×16, 8×8, 16×4, 16×12, 4×16, 12×16 | 16×16, 8×8, 4×4 |
| 8×8 | 8×8, 8×4, 4×8 | 8×8, 4×8 |

VIDEO CODING APPARATUS AND VIDEO CODING METHOD

FIELD

The present disclosure relates to a video coding apparatus and a video coding method.

BACKGROUND

In the High efficiency video coding (HEVC) that is an international video coding standard, coding is performed for each coding unit (CU) as a unit of coding. In the conventional H. 264 etc., 16 pixels high and 16 pixels wide are used as a macroblock size. On the other hand, four kinds of sizes can be used as CU sizes. In addition, various sizes can be selected for prediction units (PUs) used for intra prediction in CUs and transform units (TUs) which are units of orthogonal transform (for example, see Non-patent Literature 1).

CITATION LIST

Non Patent Literature

[NPL 1]
The HEVC standard (draft), (High Efficiency Video Coding (HEVC) text specification draft 10 (for FDIS & Last Call))

SUMMARY

Technical Problem

Such video coding apparatuses are desired to be modified to reduce complexity in control processing and prevent circuit scales from being increased.

The present disclosure provides a video coding apparatus and a video coding method for reducing complexity in control processing and preventing circuit scales from being increased.

Solution to Problem

A video coding apparatus in the present disclosure is a video coding apparatus which codes a coding target video based on a coding standard, and includes: a dividing unit configured to divide an image included in the coding target video into a plurality of control blocks; a prediction image generating unit configured to divide each of the control blocks into a plurality of prediction blocks, and generate, for each of the prediction blocks, a prediction image using one of inter prediction and intra prediction; a subtracter which generates a residual component by calculating, for each of the prediction blocks, a difference between the prediction image and the image included in the coding target video; and a signal processing unit configured to generate a compressed video by performing orthogonal transform, quantization, and variable length coding on the residual component, wherein the coding standard allows each of the control blocks to be divided into the prediction blocks such that the prediction blocks have different sizes, and the prediction image generating unit is configured to divide each of the control blocks into the prediction blocks such that the prediction blocks all have an identical size, rather than dividing each of the control blocks into the prediction blocks such that the prediction blocks have different sizes.

Advantageous Effects

The video coding apparatus in the present disclosure is capable of reducing complexity in control processing and preventing circuit scales from being increased.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENT

Hereinafter, an embodiment is described referring to the drawings as necessary. It should be noted that unnecessarily detailed descriptions may be omitted below. For example, detailed descriptions about already well-known matters and overlapping descriptions for substantially identical configurations may be omitted. Such descriptions are omitted to prevent the descriptions below from being unnecessarily redundant and help a person skilled in the art to understand the present disclosure easily.

It should be noted that the inventors provide the attached drawings and descriptions below to allow the person skilled in the art to fully understand the present disclosure, and do not intend to restrict the subject matters of the Claims by the disclosure thereof.

Embodiment

Figure 1:
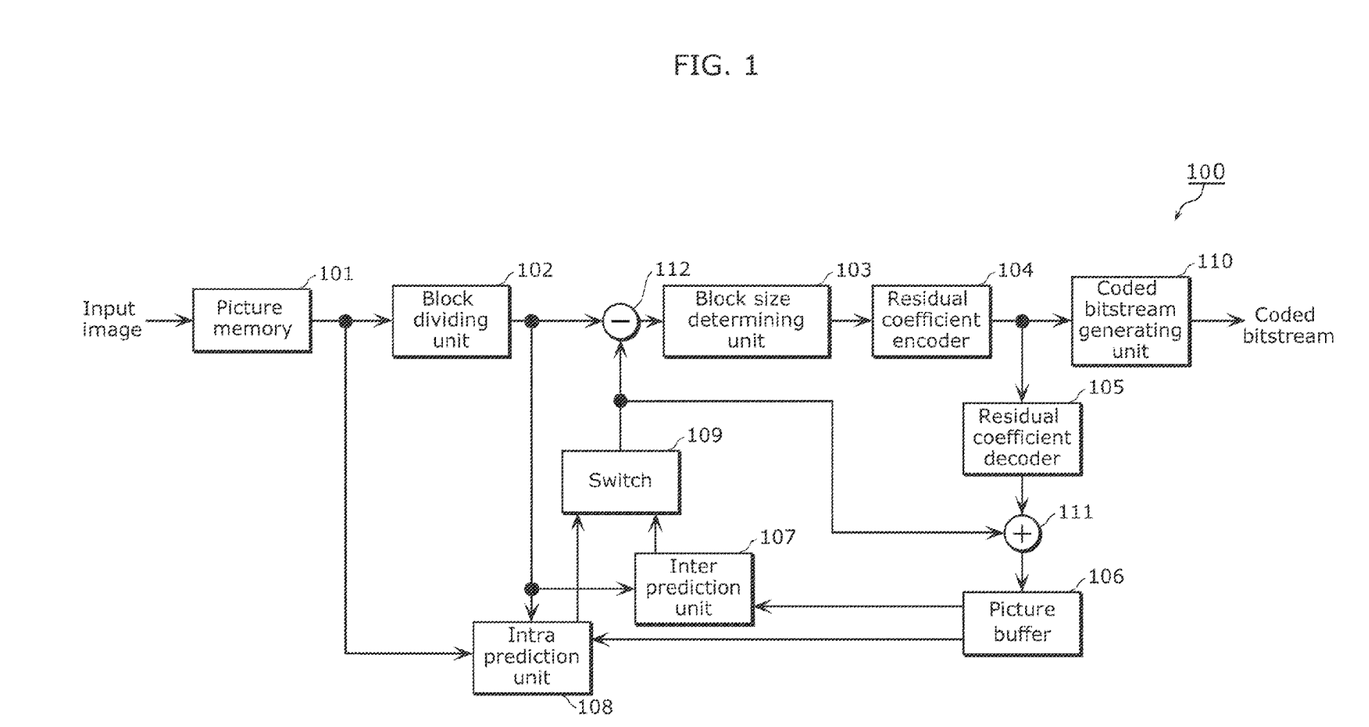
FIG. 1 is a block diagram of a video coding apparatus according to an embodiment.

Hereinafter, an embodiment is described with reference to FIGS. 1 to 8.
[Processing of Entire Coding Apparatus]
FIG. 1 is a block diagram of a video coding apparatus 100 according to this embodiment. The video coding apparatus 100 divides an input image input on a picture basis into control blocks. The video coding apparatus 100 executes coding on a control block basis to generate a coded bitstream.

The video coding apparatus 100 includes: a picture memory 101; a block dividing unit 102; a block size determining unit 103; a residual coefficient encoder 104; a residual coefficient decoder 105; a picture buffer 106, an inter prediction unit 107; an intra prediction unit 108; a switch 109; a coded bitstream generating unit 110; an adder 111; and a subtracter 112.

Figure 2:
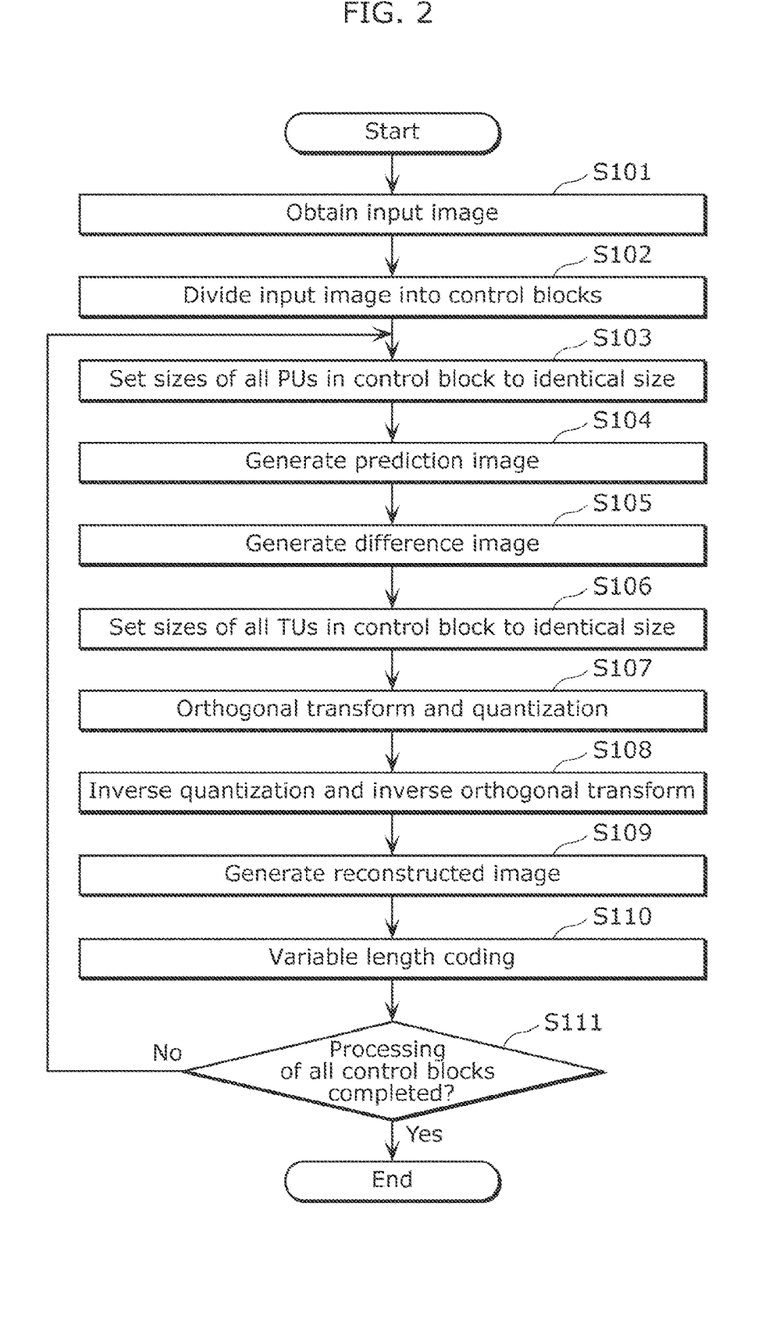
FIG. 2 is a flowchart of video coding processes according to the embodiment.

FIG. 2 is a flowchart of video coding processes performed by the video coding apparatus 100 according to the embodiment.

First, the picture memory 101 obtains an input image (S101). More specifically, the picture memory 101 rearranges, in coding order, the input images input on a picture basis in display order. In response to a read instruction from the block dividing unit 102, the picture memory 101 outputs one of the input images which is specified by the read instruction to the block dividing unit 102 and the intra prediction unit 108.

Next, the block dividing unit 102 divides the input image (picture) into a plurality of control blocks (S102). More specifically, the block dividing unit 102 outputs pixels of a coding target picture, for each block to be output. The size of the output block is one of a plurality of block sizes which are preset.

Figure 3:
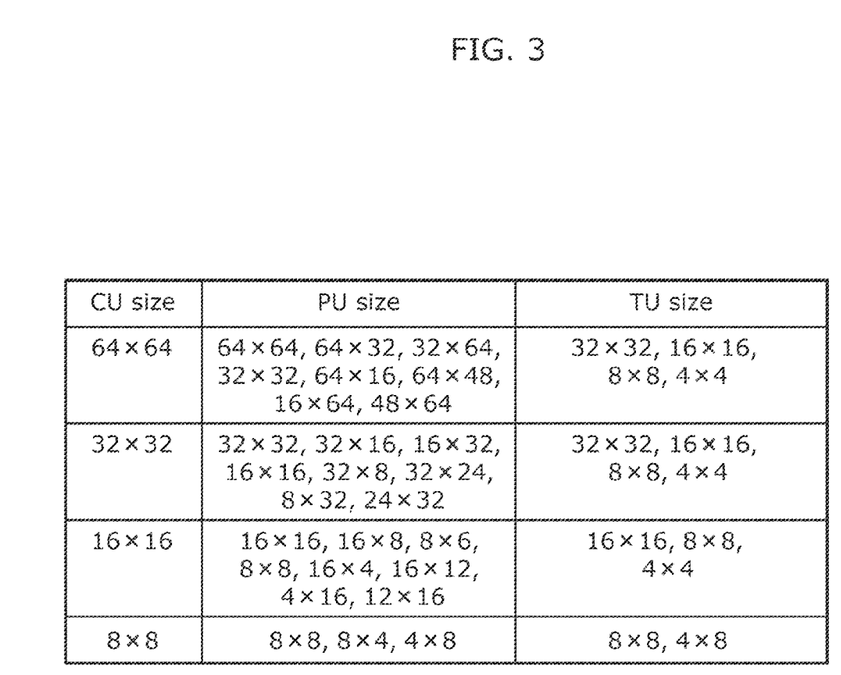
FIG. 3 is a diagram for explaining sizes of each of kinds of blocks that can be used in inter prediction according to the embodiment.

More specifically, the block dividing unit 102 divides an input image input from the picture memory 101 into blocks called coding units (CUs) which are units of coding. FIG. 3 is a diagram for explaining block sizes that can be used in inter prediction in the HEVC standard.

It is to be noted that the blocks that are output by the block dividing unit 102 may be a single CU, or may be a coding tree unit (CTU) made up of a plurality of CUs. In this embodiment, a CU or a CTU corresponds to a control block.

As illustrated in FIG. 3, the CU has a size selected from the four kinds of block sizes ranging from 64×64 pixels to 8×8 pixels. In general, a block having a small block size is selected for use in an image area in which pixel values are complex or an image area in which motions of a subject are complex. On the other hand, a block having a large block size is selected for use in an image area in which pixel values are simple or an image area in which motions of a subject are simple.

In addition, the subsequent processes are performed on the basis of the CU or the CTU including the plurality of CUs which have been output by the block dividing unit 102. For the purpose of illustration, a configuration for performing processes on a CU basis is described below.

Next, the inter prediction unit 107 sets, for a CU, a block (a prediction unit (PU)) for prediction having a block size smaller than or equal to the size of the CU. More specifically, the inter prediction unit 107 sets the sizes of all of the PUs in a control block (CU or CTU) to an identical size (S103). This processing is described in detail later. Next, the inter prediction unit 107 generates a prediction image for each PU that has been set (S104).

More specifically, the inter prediction unit 107 performs inter prediction using a reconstructed image of a preceding picture that has already been coded and stored in the picture buffer 106, based on the CU input from the block dividing unit 102. More specifically, the inter prediction unit 107 searches for (by performing motion search) a reconstructed image area having a pixel configuration most similar to the pixel configuration of an input image, to generate (performs motion compensation on) the searched-out reconstructed image area as a prediction image. At this time, the inter prediction unit 107 performs motion compensation on the basis of a block (PU) obtained by further dividing a CU block.

As illustrated in FIG. 3, in the HEVC standard, when a CU has a block size of 32×32 pixels for example, the block size of a PU can be selected from among eight kinds of block sizes from 32×32 pixels to 24×32 pixels. However, in this embodiment, the inter prediction unit 107 sets the identical size to all of the plurality of PU sizes included in the CU or the CTU output by the block dividing unit 102. It should be noted that the inter prediction unit 107 selects a small PU size for an image in which motions of an object are complex, and a large PU size for an image in which motions of an object are simple.

For each of CUs output by the block dividing unit 102, the intra prediction unit 108 obtains already coded pixels which are pixels neighboring the CU from the picture buffer 106. The intra prediction unit 108 generates an intra prediction image using the obtained pixels. It should be noted that the size identical to the size of the CU is basically used as the size of the prediction block (PU) for intra prediction. As an exception, only when the CU size is the minimum one (8×8 pixels), it may be allowed to use a prediction block (8×4 pixels or 4×8 pixels) obtained through horizontal or vertical division into two blocks.

The switch 109 selects a prediction image having a higher coding efficiency from among prediction images which have been generated by the inter prediction unit 107 or the intra prediction unit 108, and outputs the selected prediction image. More specifically, the switch 109 selects, from among the intra prediction and the inter prediction, the prediction method that yields the smaller sum of the amount of information required to code a prediction residual and the amount of side information such as a motion vector etc.

The subtracter 112 generates a difference image having pixel values presenting differences between the CU-based input image input from the block dividing unit 102 and the CU-based prediction image input from the switch 109 (S105). The subtracter 112 outputs the generated difference image to the block size determining unit 103.

The block size determining unit 103 determines the optimum block size in view of the coding efficiencies from among a plurality of orthogonal transform block sizes (TU sizes) illustrated in FIG. 3. For example, the block size determining unit 103 determines a TU size through comparison between the amounts of information obtainable by performing Hadamard transform on input difference images using the TU sizes of the respective difference images. In addition, the block size determining unit 103 sets the sizes of all of the TUs in the control block (CU or CTU) to an identical size (S106). This processing is described in detail later.

The residual coefficient encoder 104 generates a residual coefficient by performing orthogonal transform and quantization for each of the TUs which has been set (S107).

More specifically, the residual coefficient encoder 104 generates orthogonal transform coefficients by performing orthogonal transform on the difference image generated in the subtracter 112 using, as a unit of processing, the TU having the block size determined in the block size determining unit 103. Furthermore, the residual coefficient encoder 104 generates residual coefficients by performing quantization on frequency components of the resulting orthogonal transform coefficients.

The residual coefficient decoder 105 generates the orthogonal transform coefficients by performing inverse quantization on the residual coefficients input from the residual coefficient encoder 104 using, as the unit of processing, the TU having the block size determined in the block size determining unit 103. Furthermore, the residual coefficient decoder 105 generates a reconstructed difference image by performing inverse orthogonal transform on the resulting orthogonal transform coefficients (S108).

The adder 111 generates the reconstructed image by adding the reconstructed difference image input from the residual coefficient decoder 105 and the prediction image input from the switch 109 on a CU basis (S109).

The picture buffer 106 stores the reconstructed image input from the adder 111. This reconstructed image is referred to in inter prediction of a picture to be coded temporally after a current coding target picture. In addition, this reconstructed image is referred to in intra prediction of a CU to be coded after in coding order than the current coding target CU.

The coded bitstream generating unit 110 generates a coded bitstream by performing variable length coding and arithmetic coding on the residual coefficients input from the residual coefficient encoder 104 and coding information to be required in decoding (S110). It is to be noted that the coded bitstream generating unit 110 may perform the processes at any time after the residual coefficients are generated (after Step S107).

In addition, whether or not the processing of all control blocks (CUs) has been completed is determined (S111). If the processing has not yet been completed (No in S111), the processes in Steps S103 and S110 are repeated on a control block basis.

Hereinafter, details of operations performed by the block size determining unit 103, the inter prediction unit 107, and the intra prediction unit 108 are described with reference to the drawings.

Figure 4:
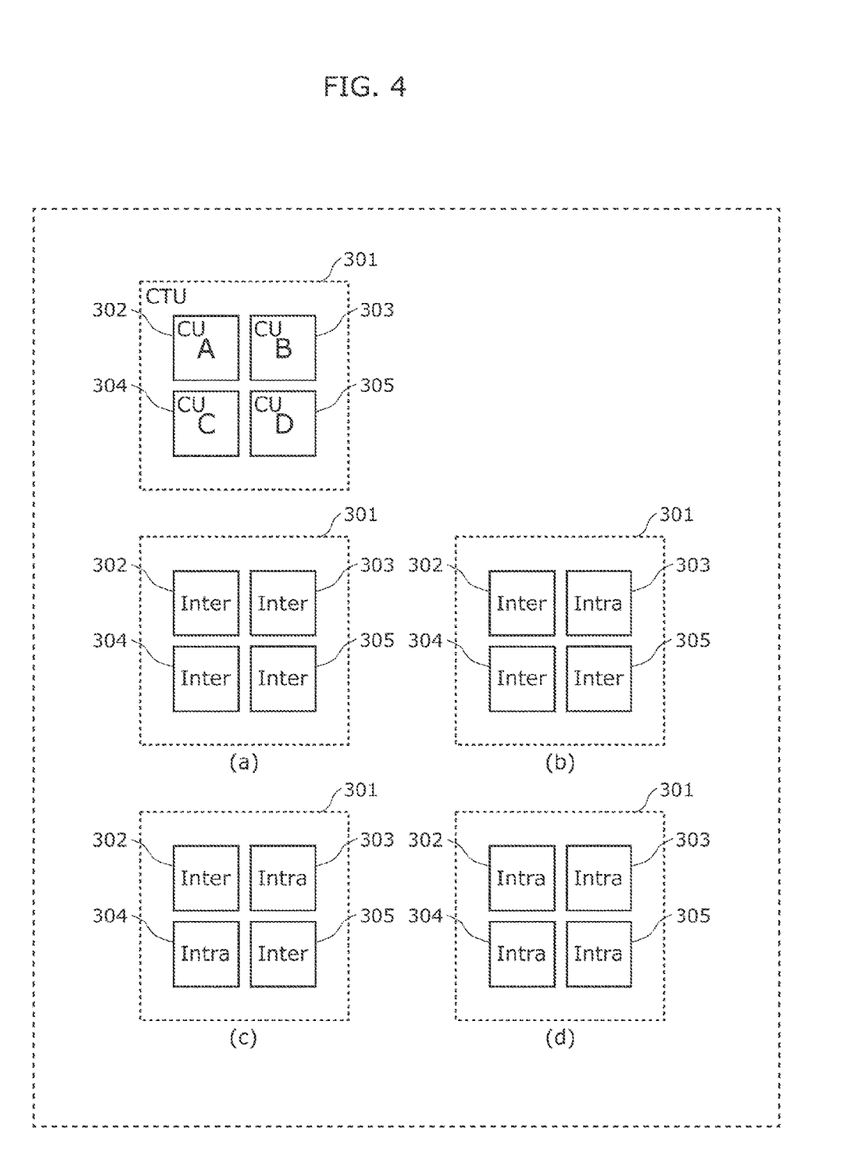
FIG. 4 is a diagram for explaining a combination of prediction methods according to the embodiment.

FIG. 4 is a diagram illustrating four CTUs 301 which are a CU 302 (position A), a CU 303 (position B), a CU 304 (position C), and a CU 305 (position D). In FIG. 4, (a) is a diagram illustrating a case where all of CUs are subject to inter prediction. In addition, (b) of FIG. 4 is a diagram illustrating a case where only the CU 303 is subject to intra prediction. In addition, (c) of FIG. 4 is a diagram illustrating a case where only the CU 304 located at the lower left position (position C) is subject to intra prediction, in addition to the CU 303 located at the upper right position (position B). In addition, (d) of FIG. 4 is a diagram illustrating a case where all of CUs are subject to intra prediction.

Figure 5:
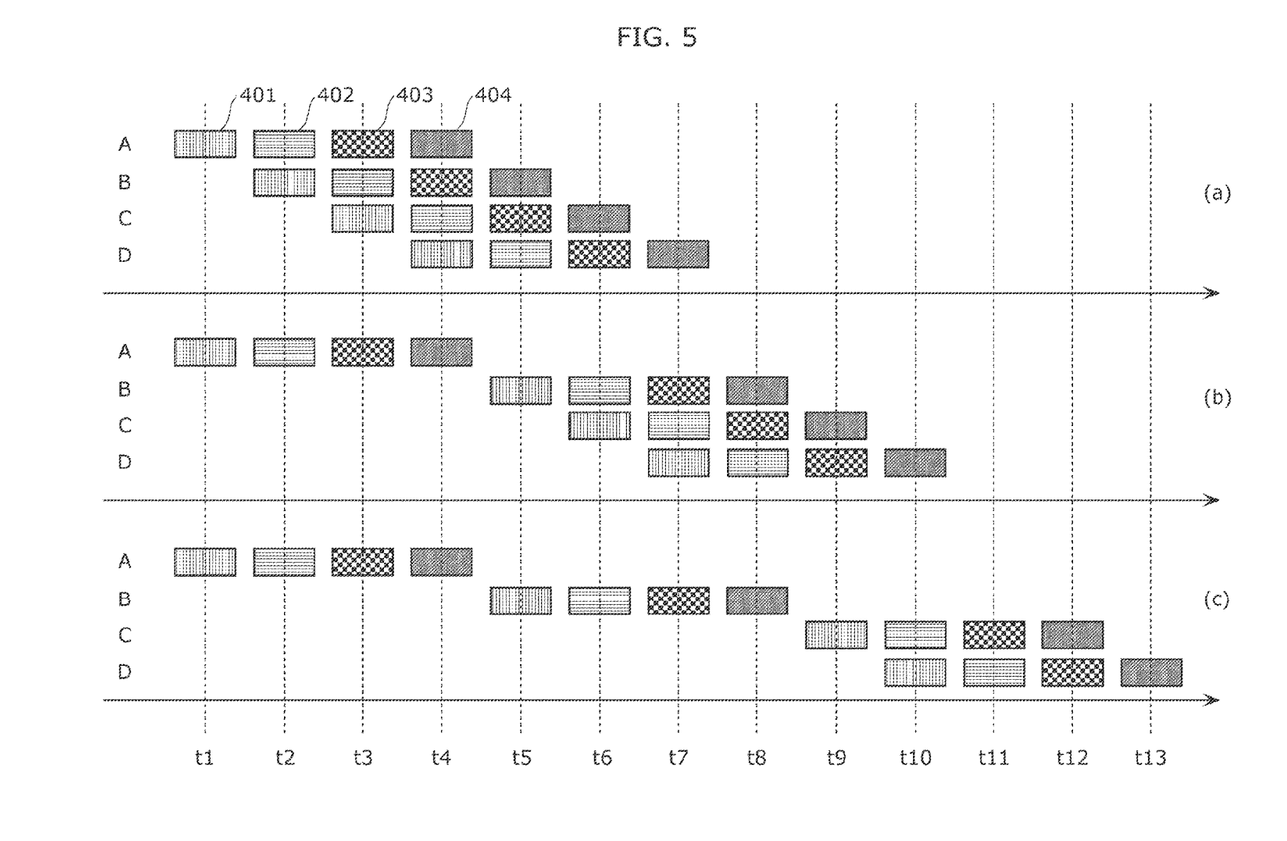
FIG. 5 is a diagram for explaining pipeline operations according to the embodiment.

FIG. 5 illustrates timing charts in the cases where the respective CTUs 301 of three patterns illustrated in (a) to (c) of FIG. 4 are processed in a pipeline configuration having the processing units illustrated in FIG. 1 as constituent elements. An instruction 401 specifies an operation by the inter prediction unit 107 or the intra 3o prediction unit 108. An instruction 402 specifies an operation by the switch 109, the subtracter 112, and the block size determining unit 103. An instruction 403 specifies an operation by the residual coefficient encoder 104. An instruction 404 specifies an operation by the residual coefficient decoder 105 or the adder 111.

It is to be noted that the instruction 401 in FIG. 5 is presented as a vertically striped block. The instruction 402 is presented as a horizontally striped block. Furthermore, the instruction 403 is presented as a houndstooth check block. The instruction 404 is presented as a shaded block.

The vertical axis of FIG. 5 denotes a process on each CU. Each A along the vertical axis of FIG. 5 denotes a process on the CU 302 illustrated in FIG. 4. In addition, B along the vertical axis denotes a process on the CU 303 illustrated in FIGS. 4. C and D along the vertical axis denote processes on the CU 304 and CU 305, respectively.

The horizontal axis of FIG. 5 denotes time transition. For example, as for the position A, FIG. 5 denotes sequential transition from the instruction 401 to the instruction 404 with time transition.

[Details of Operation by Block Size Determining Unit 103]

For example, when the optimum TU size is determined considering coding efficiencies, the block size determining unit 103 sets the sizes of all of the TUs in a CTU to be output by the block dividing unit 102 to an identical size.

In the HEVC standard, several TU sizes can be selected based on FIG. 3, according to the size of the CUs included in the CTU. However, in this embodiment, the block size determining unit 103 sets the single optimum TU size for all of the CUs included in the single CTU.

Figure 6:
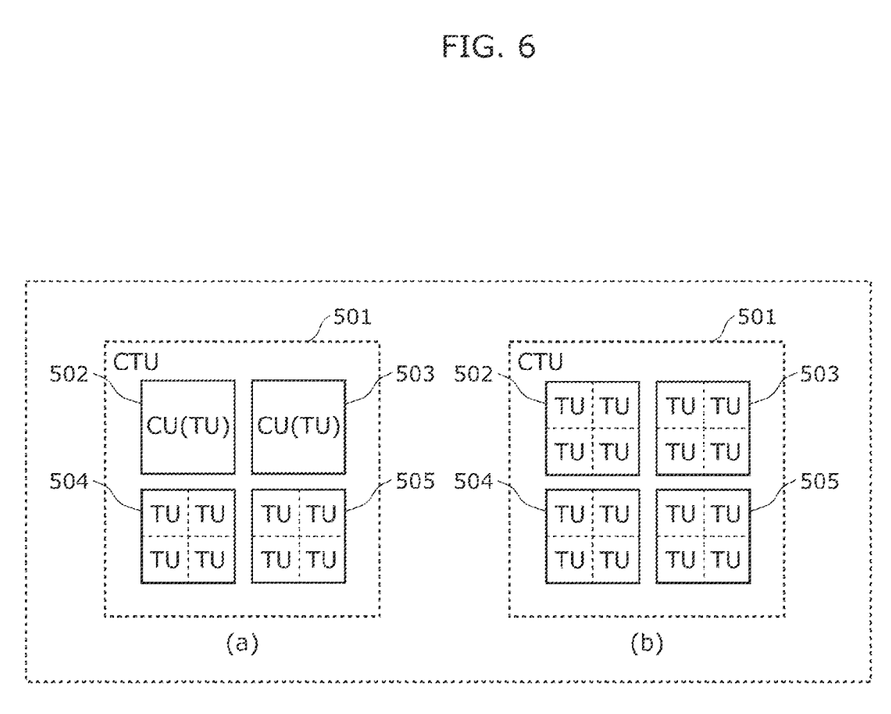
FIG. 6 is a diagram for explaining sizes of orthogonal transform blocks according to the embodiment.

This operation is described using FIG. 6. In FIG. 6, (a) illustrates a case where a CTU 501 of 32 pixels high and 32 pixels wide includes four CUs which are a CU 502, a CU 503, a CU 504, and a CU 505.

In the HEVC standard, three kinds of TU sizes are allowed as illustrated in the case of 16×16 CU size in FIG. 3. For example, as illustrated in (a) of FIGS. 6, 16×16 and 8×8 are selected for the CUs 502 and 503 and the CUs 504 and 505, respectively, as the optimum TU size for each CU.

On the other hand, the block size determining unit 103 in this embodiment sets, for each of CTUs to be output by the block dividing unit 102, the TU sizes of all of the CUs of the CTU to an identical size. More specifically, the block size determining unit 103 uses only configurations in which the sizes of TUs in all of the CUs are identical, as candidate TU sizes for the CUs of each CTU. Subsequently, the inter prediction unit 107 determines the optimum TU size considering coding efficiencies from among the candidate TU sizes. For example, when the TU size is 8×8, the TU size in all of the CUs is set to the identical size as illustrated in (b) of FIG. 6.

It is to be noted that the block size determining unit 103 may determine a TU size for a single CU from among the CUs of a CTU, and apply the determined TU size to another CU.

With the configuration, the TU size used in orthogonal transform in the residual coefficient encoder 104 and the residual coefficient decoder 105 is set to be identical. As a result, variation in processing time required for orthogonal transform in the processing unit is reduced. In this way, as illustrated in (a) of FIG. 5, disturbance in pipeline processing is reduced.

In addition, also in the case where a circuit for performing orthogonal transform is configured using a reconfigurable device, the identical TU size is used in the CTU. Thus, it is possible to reduce the number of times of occurrence of reconstruction. As a result, the disturbance in pipeline processing caused by time for reconstruction is reduced in the identical CTU. In addition, it is possible to reduce increase in power consumption for reconstruction.

[Operations Performed by Inter Prediction Unit 107 and Intra Prediction Unit 108]

The inter prediction unit 107 in this embodiment sets a PU size in a CU as indicated below. In other words, in this embodiment, the inter prediction unit 107 sets the sizes of all PUs belonging to the CU to an identical size. In addition, as for a plurality of CUs of a CTU to be output by the block dividing unit 102, the inter prediction unit 107 sets the sizes of all PUs of the plurality of CUs to an identical size.

In this case, for example, the operation is performed by restricting the PU sizes used when the inter prediction unit 107 performs motion search. Hereinafter, the above operation is described using FIG. 7.

Figure 7:
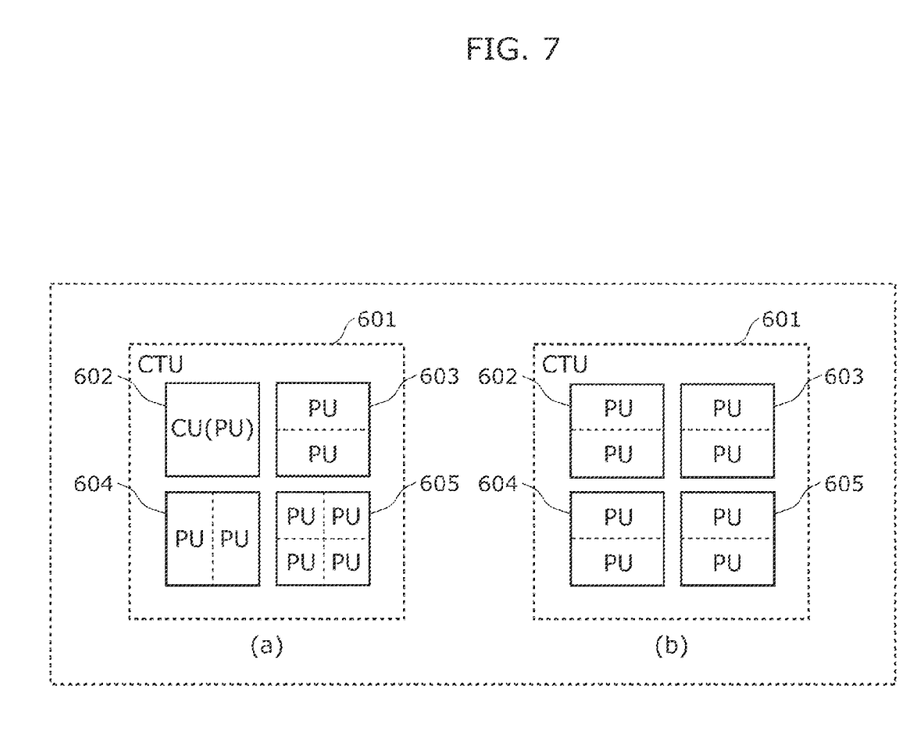
FIG. 7 is a diagram for explaining sizes of prediction blocks according to the embodiment.
Figure 8:
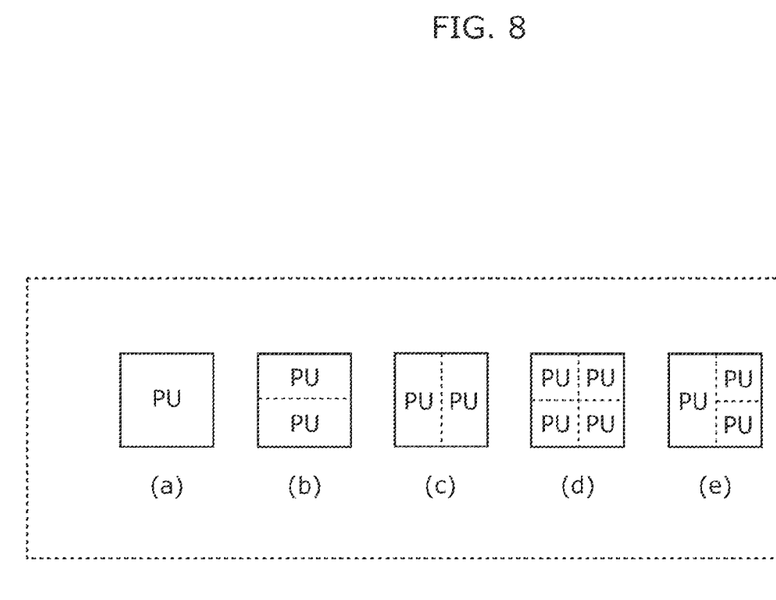
FIG. 8 is a diagram for explaining sizes of prediction blocks according to the embodiment.

In FIG. 7, (a) illustrates a case where a CTU 601 of 32 pixels high and 32 pixels wide includes four CUs which are a CU 602, a CU 603, a CU 604, and a CU 605.

In the case of motion search in the HEVC standard, eight kinds of PU sizes are allowed as illustrated in the case of 16×16 CU size in FIG. 3. For example, as illustrated in (a) of FIG. 7, 16×16, 16×8, 8×16, and 8×8 are selected for the CU 602, the CU 603, the CU 604, and the CU 605, respectively, as the optimum PU sizes for the respective CUs.

On the other hand, the inter prediction unit 107 in this embodiment, motion search is performed to set, for each of CTUs to be output by the block dividing unit 102, the PU sizes of all CUs of the CTU to an identical size. More specifically, the inter prediction unit 107 employs only the configurations in which the sizes of PUs in all of the CUs are identical, as candidate PU sizes for the CUs of the CTU. Subsequently, the inter prediction unit 107 selects the optimum one of the results of motion search performed for each of candidate PU sizes, and generates a prediction image using the selected optimum result of motion search. For example, when the PU size is 16×8, the PU size in all of the CUs is set to the identical size as illustrated in (b) of FIG. 7.

The inter prediction unit 107 may determine a PU size for a single CU from among the CUs of a CTU, and apply the determined PU size to the other CUs.

When an output from the block dividing unit 102 is a single CU of 16 pixels high and 16 pixels wide, the inter prediction unit 107 sets the sizes of all PUs in the CU to an identical size. For example, the inter prediction unit 107 performs motion search regarding, as candidates, four configurations illustrated in (a) to (d) of FIG. 8. In addition, the inter prediction unit 107 does not use any pattern in which PUs having different sizes are included in a CU as illustrated in (e) of FIG. 8.

Normally in intra prediction, CU sizes and PU sizes which are blocks for prediction are basically identical. For this reason, even when the block dividing unit 102 outputs a CTU including a plurality of CUs, the PU sizes of the plurality of CUs are all identical. However, one of the PU sizes obtained by horizontally or vertically dividing a CU into two blocks may be used only when the CU size is the minimum size. In this case, the intra prediction unit 108 operates to apply, to all of the CUs, either a configuration in which a CU is divided into two PUs for use in intra prediction or a configuration in which a CU is not divided into two PUs for use in intra prediction.

With the configuration stated above, the video coding apparatus 100 according to this embodiment sets the PU sizes of all of the CUs of the CTU to the identical size. This results in reduction of variation in processing time for each CU in either the inter prediction unit 107 or the intra prediction unit 108. In this way, as illustrated in (a) of FIG. 5, disturbance in pipeline processing is reduced.

[Modifications to Prediction Operations]

Hereinafter, modifications to prediction operations in the inter prediction unit 107 and the intra prediction unit 108 are described with reference to the drawings.

When the block dividing unit 102 outputs a CTU including a plurality of CUs, the switch 109 outputs a CTU having a corresponding size. For this reason, the inter prediction unit 107 and the intra prediction unit 108 which are sources of inputs to the switch 109 also output a corresponding CTU that is a plurality of CUs. In this case, the switch 109 selects an identical one of prediction methods which are intra prediction and inter prediction, for every one of CUs in each of CTUs, as illustrated in (a) and (d) of FIG. 4. In addition, the switch 109 does not select different prediction methods for the plurality of CUs included in each of CTUs, as illustrated in (b) and (c) of FIG. 4.

Here, advantages of switching intra prediction and inter prediction on a CTU basis as described above are described with reference to FIGS. 4 and 5.

In (a) of FIG. 4, inter prediction is performed on all of CUs, and thus no coded neighboring pixels are required for the prediction. For this reason, a pipeline operation as illustrated in (a) of FIG. 5 is possible. In other words, it is possible to perform processes on the CUs 303, 304, and 305 in parallel with a process on the CU 302.

On the other hand, in the case of (b) of FIG. 4, the CU 303 is subject to intra prediction that requires the pixel values of decoded neighboring pixels. For this reason, the video coding apparatus 100 cannot start prediction for the position B until decoding of residual coefficients at the position A is completed. In this way, a pipeline operation as illustrated in (b) of FIG. 5 is performed.

Likewise, in the case of (c) of FIG. 4, intra prediction is used for CUs at the positions B and C. Thus, a pipeline operation as illustrated in (c) of FIG. 5 is performed.

In this way, pipeline operations and the number of pipeline stages vary depending on (i) whether or not intra prediction and inter prediction are performed in an identical CTU, and (ii) the number of times of intra prediction. In order to perform pipeline operations in all of such cases, extremely complex circuit configurations are required. On the other hand, the switch 109 according to this embodiment uses only one kind of prediction method in a CTU. In this case, the above disadvantages can be cleared.

In addition, in order to enable prediction using different PU sizes, it is conceivable to configure the inter prediction unit 107 or the intra prediction unit 108 using a reconfigurable device. In this case, according to this embodiment, since a configuration in which the sizes of all PUs are identical in a CTU is used, it is possible to reduce the number of times of occurrence of reconstruction processing in a device in processing time for the CTU. In this way, disturbance in pipeline processing is reduced. Furthermore, it is also possible to reduce increase in power consumption for frequent reconstruction.

CONCLUSION

The video coding apparatus 100 according to this embodiment is an apparatus which codes a coding target video, based on a coding standard, and includes: a picture memory 101 which stores a video; a block dividing unit 102 which divides an image included in the video into a plurality of control blocks (CUs or CTUs); an inter prediction unit 107 or an intra prediction unit 108 which divides each of the control blocks into a plurality of prediction blocks (PUs), and generates, for each prediction block, a prediction image using a corresponding one of inter prediction and intra prediction; a subtracter 112 which generates a residual component by calculating a difference between the generated prediction image and the image included in the video for each prediction block; a block size determining unit 103 which generates a compressed video by performing orthogonal transform, quantization, and variable length coding on the residual component; a residual coefficient encoder 104; and a coded bitstream generating unit 110. In the predetermined coding standard, it is allowed to divide each of the control blocks into the prediction blocks such that the prediction blocks have different sizes. However, it is allowed to set the sizes of the prediction blocks of the control block to different sizes. Either the inter prediction unit 107 or the intra prediction unit 108 divides each control block into the prediction blocks such that the prediction blocks all have an identical size, rather than dividing each control block into the prediction blocks such that the prediction blocks have different sizes. In other words, either the inter prediction unit 107 or the intra prediction unit 108 sets the sizes of all of the prediction blocks of the control block to an identical size, rather than setting the sizes thereof to different sizes. Stated differently, either the inter prediction unit 107 or the intra prediction unit 108 prohibits the sizes of all of the prediction blocks of the control block from being set to different sizes. In short, either the inter prediction unit 107 or the intra prediction unit 108 always sets the sizes of all of the prediction blocks of the control block to an identical size.

For example, in the HEVC, various sizes can be selected as sizes of prediction blocks, and a coding efficiency is increased. On the other hand, in order to realize hardware which can support processes on all of the block sizes illustrated in FIG. 3, circuit scales larger by several times than hardware conforming to the H. 264 standard are required. In particular, when processing a 4K image having an image resolution four times finer than that of a full HD image, the number of pixels to be processed is extremely large, and thus a plurality of processing elements need to be performed in parallel. One conceivable parallel process configuring method is a pipeline configuration in which the processing elements are arranged in sequence.

However, in the pipeline configuration, in order to cause the processing elements to function efficiently, there is a need to reduce waiting time which occurs due to variation in the processing time by the processing elements or a dependency of data. In addition, when such variation requiring waiting time cannot be prevented, for example, there is a need to design a circuit considering either increase in circuit scale due to addition of a circuit for exception processing or a margin for variation.

In view of this, with the configuration, PU sizes used when generating a prediction image are all set to be identical in the control block. This results in reduction of variation in processing time for each CU in either the inter prediction unit 107 or the intra prediction unit 108. In this way, as illustrated in (a) of FIG. 5, disturbance in pipeline processing is reduced.

In addition, the inter prediction unit 107 for inter prediction and the intra prediction unit 108 for intra prediction in this embodiment are switched, for each CU or CTU, to generate a prediction image using a corresponding one of inter prediction and intra prediction for all of the PUs in a CU or a CTU. The coding standard allows a combination of inter prediction and intra prediction to be used for the prediction blocks (PUs) obtained through the division of a given one (a CU or CTU) of the control blocks. Either the inter prediction unit 107 for inter prediction or the intra prediction unit 108 for intra prediction generates the prediction image using the corresponding one of inter prediction and intra prediction for every one of the prediction blocks obtained through the division of the given one of the control blocks, without using the combination of inter prediction and intra prediction for the prediction blocks obtained through the division of the given one of the control blocks. In other words, the inter prediction unit 107 and the intra prediction unit 108 prohibit different prediction methods from being used for the prediction blocks in the control block. Stated differently, each of the inter prediction unit 107 and the intra prediction unit 108 always uses an identical prediction method that is the corresponding one of inter prediction and intra prediction for all of the prediction blocks in the control block.

In this way, as illustrated in (a) of FIG. 5, disturbance in pipeline processing is reduced.

In addition, the block size determining unit 103 divides each control block (a CU or CTU) into a plurality of orthogonal transform blocks (TUs), and performs orthogonal transform on the residual component for each orthogonal transform block. In the coding standard, it is allowed to divide each of the control blocks into the orthogonal transform blocks such that the orthogonal transform blocks have different sizes. The block size determining unit 103 divides each control block into the orthogonal transform blocks such that the orthogonal transform blocks all have the identical size without dividing each control block into the orthogonal transform blocks such that the orthogonal transform blocks have different sizes. In other words, although, in the coding standard, it is allowed to set the sizes of the orthogonal transform blocks in the control block to different sizes, the block size determining unit 103 sets the sizes of all of the orthogonal transform blocks in the control block to the identical size, rather than setting the sizes thereof to different sizes. Stated differently, the block size determining unit 103 prohibits the sizes of the orthogonal transform blocks in the control block to different sizes. In other words, the block size determining unit 103 always sets the sizes of the orthogonal transform blocks in the control block to the identical size.

In this way, the residual coefficient encoder 104 and the residual coefficient decoder 105 reduce variation in processing time on CUs.

In addition, the size of each control block (CU) is 16 pixels high and 16 pixels wide. In this way, it is possible to reduce modifications from video coding apparatuses conforming to the conventional H. 264 etc.

These general and specific aspects may be implemented using an apparatus, a system, a method, an integrated circuit, a computer program, or a computer-readable recording medium such as a CD-ROM, or any combination of apparatuses, systems, methods, integrated circuits, computer programs, or computer-readable recording media.

Each of the constituent elements in the above-described embodiment may be configured in the form of an exclusive hardware product, or may be realized by executing a software program suitable for the constituent element. Each of the constituent elements may be realized by means of a program executing unit, such as a CPU and a processor, reading and executing the software program recorded on a recording medium such as a hard disk or a semiconductor memory. In addition, all of the numerals above are used for the purpose of specifically explaining the present disclosure, and thus the present disclosure is not limited to the exemplary numerals.

In addition, functional blocks in the block diagram are divided as an example. Thus, some of the functional blocks may be integrated into a single functional block, a single functional block may be divided into a plurality of functional blocks, or part of functions of a functional block may be transferred to another one of the functional blocks. Furthermore, similar functions of some of the functional blocks may be processed by hardware or software in parallel or in time division.

In addition, the execution order of a plurality of steps illustrated in the flowchart is provided for the purpose of specifically explaining the present disclosure, and thus other execution orders are possible. Some of the steps may be executed at the same time (in parallel) with any of the other steps.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The video coding apparatus according to the present disclosure is applicable to apparatuses for broadcasting services, consumer recorders, digital video cameras, personal computers, mobile phones, etc. used to store and transmit coded streams generated by coding video signals.

The invention claimed is:

1. A video coding method for coding a current block of a current image, the video coding method comprising:
dividing a processing unit into a plurality of coding blocks, the processing unit being included in the current image;
dividing each of the coding blocks into a plurality of transform blocks, each of the transform blocks in the processing unit having an identical size, the identical size always being one size from among three or more transform block sizes;
generating a prediction image;
generating a residual component by calculating a difference between the prediction image and the current image; and
transforming and quantizing on the residual component.

2. A video coding apparatus for coding a current block of a current image, the video coding apparatus comprising:
a processor; and
a non-transitory memory, wherein the processor is configured to execute a program stored in the memory to perform the following steps:
dividing a processing unit into a plurality of coding blocks, the processing unit being included in the current image;
dividing each of the coding blocks into a plurality of transform blocks, each of the transform blocks in the processing unit having an identical size, the identical size always being one size from among three or more transform block sizes;
generating a prediction image;
generating a residual component by calculating a difference between the prediction image and the current image; and
transforming and quantizing on the residual component.

3. A video coding method for coding a first processing unit and a second processing unit in a moving image, the video coding method comprising:
dividing the first processing unit into a plurality of first coding blocks and the second processing unit into a plurality of second coding blocks;
dividing each of the first coding blocks into a plurality of first transform blocks, each of the first transform blocks in the processing unit having a first identical size, the first identical size always being one size from among three or more transform block sizes;
dividing each of the second coding blocks into a plurality of second transform blocks;
generating prediction images for the first processing unit and the second processing unit;
generating residual components by calculating differences between the prediction image and the first processing unit and between the prediction image and the second processing unit, respectively; and
transforming and quantizing on the residual components.

4. A video coding apparatus for coding a current block of a current image, the video coding apparatus comprising:
a processor; and
a non-transitory memory, wherein the processor is configured to execute a program stored in the memory to perform the following steps:
dividing a first processing unit into a plurality of first coding blocks and a second processing unit into a plurality of second coding blocks;
dividing each of the first coding blocks into a plurality of first transform blocks, each of the first transform blocks in the processing unit having a first identical size, the first identical size always being one size from among three or more transform block sizes;
dividing each of the second coding blocks into a plurality of second transform blocks;
generating prediction images for the first processing unit and the second processing unit;
generating residual components by calculating differences between the prediction image and the first processing unit and between the prediction image and the second processing unit, respectively; and
transforming and quantizing on the residual components.

* * * * *